No. 842,113.

PATENTED JAN. 22, 1907.

E. L. PITTS.
NUT LOCK.
APPLICATION FILED JAN. 11, 1906.

Witnesses
Samuel E. Wade,
Anson W. Hart.

Inventor
EDWARD L. PITTS.

By Munn & Co.
Attorneys

UNITED STATES PATENT OFFICE.

EDWARD LINCOLN PITTS, OF PHŒNIX, ARIZONA TERRITORY, ASSIGNOR OF ONE-HALF TO GEORGE W. KANE, OF PHŒNIX, ARIZONA TERRITORY.

NUT-LOCK.

No. 842,113.   Specification of Letters Patent.   Patented Jan. 22, 1907.

Application filed January 11, 1906. Serial No. 295,589.

*To all whom it may concern:*

Be it known that I, EDWARD LINCOLN PITTS, a citizen of the United States, and a resident of Phœnix, in the county of Maricopa and Territory of Arizona, have invented an Improvement in Nut-Locks, of which the following is a specification.

My invention is an improved nut-fastening adapted for application in various ways, but particularly for the pivots of barbers' shears, scissors, and other cutting implements.

The invention is embodied chiefly in the construction of the nut, as will be hereinafter set forth.

The construction, arrangement, and combination of parts are as hereinafter described, and illustrated in the accompanying drawings, in which—

Figure 1:
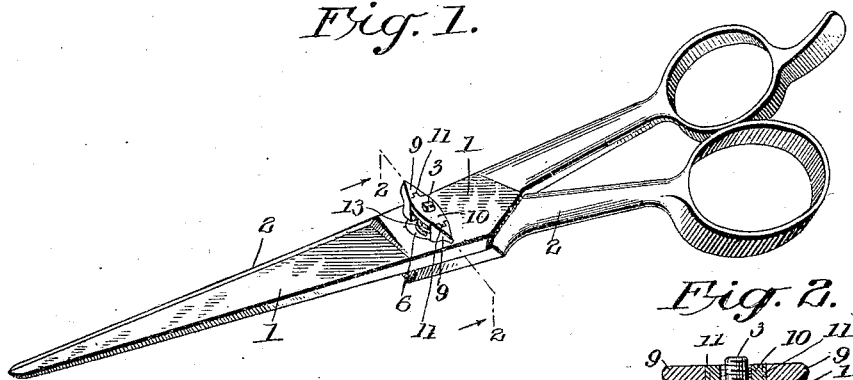
Figure 2:
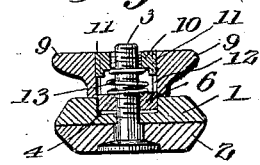
Figure 4:
Figure 3:
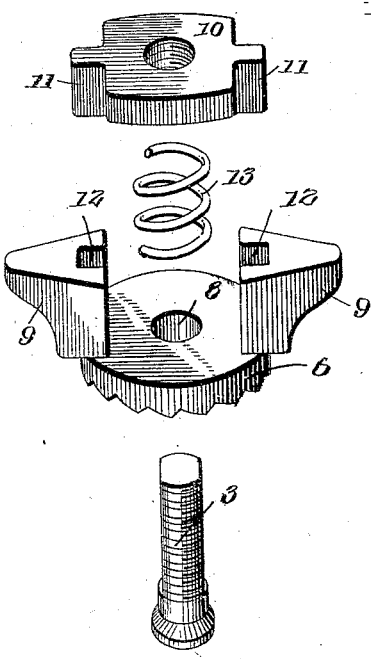
Figure 5:
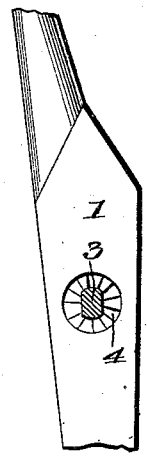
Figure 7:
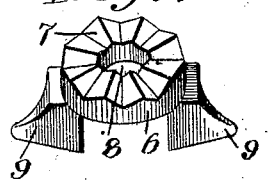
Figure 6:
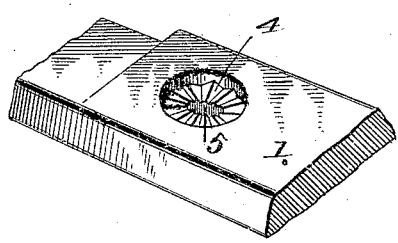

Figure 1 is a perspective view of a barber's shears provided with my improved lock-nut and pivot attachment. Fig. 2 is an enlarged cross-section on the line 2 2 of Fig. 1. Fig. 3 is a view in perspective of the several parts of the lock-nut attachment enlarged and separated or disassociated from each other. Figs. 4 and 5 are plan views of portions of blades of shears, illustrating certain features of my invention. Fig. 6 is a perspective view showing a portion of one of the parts or members provided with a half-clutch constituting part of my improved fastening. Fig. 7 is a perspective view of the loose or rotatable clutch member, the same being shown with its toothed face uppermost.

In Fig. 1 the numerals 1 and 2 indicate two members, in this instance the blades of shears to whose connecting screw-bolt my invention is applied. As shown in Fig. 4, the under member 2 has a round hole for reception of the pivot-screw 3, and, as shown in Fig. 5, the upper member 1 has an oblong hole for reception of the correspondingly-shaped portion of the pivot-screw 3. Thus the said screw is free to rotate in the under member 2, but always rotates with the upper member 1. Any suitable form may be given to the portion of the screw which is threaded for the purpose of locking it, and thus causing it to rotate with the upper member 1; but the simplest construction consists in cutting away or flattening one or both sides of the screw-threaded portion, as shown in Figs. 3 and 5. The member 1 is provided with a series of radial teeth 4, (see Figs. 5 and 6,) the same being formed at the bottom of a circular depression or socket in the part and surrounding the oval screw-hole 5. A loose or rotatable toothed clutch member 6 (see Figs. 1, 2, 3, 7) is applied to the screw and provided on its under side with radial teeth 7, which are adapted to engage the teeth 4 in part 1. It will be understood that the teeth of the respective parts 4 and 7 are similar in form, the same being obtuse-angled in cross-section or end view to slide on the ratchet so as to duly engage and lock and yet be adapted to slide on each other. The central hole 8 in the clutch member 6 is circular, so that the latter may rotate on the screw 3. The member proper is provided, as shown, with lateral projections 9, that are provided with internal grooves to receive lateral projections of the nut and are also adapted to serve as thumb-pieces for rotating the member in either direction. A nut 10 is applied to the screw 3 and provided with end projections or wings 11, that enter corresponding grooves or sockets 12 in the wings or projections 9 of the rotatable ratchet member, so that the nut is always rotated with the latter. A spiral spring 13 is interposed between the nut 10 and the upper side of the ratchet member 6, as shown in Fig. 2.

When the parts composing the attachment are applied to the pivoted members 1 2, as shown in Figs. 1 and 2, the clutch member 6 is rotated until the nut 10 is carried down on the screw-pivot 3 far enough to apply the required degree of pressure to the spring 13, or, in other words, to compress the said spring to the degree required to cause the cutting edges of the said members 1 2 to work in close contact. Thus the edges are held in elastic but firm contact. It is apparent that such tension of the spring may be increased as required by further rotation of the nut by aid of the toothed member 6, and thus wear may be taken up when required. It will be further understood that in rotating the member 6 its teeth slide over teeth 4, formed in the socket of the member 1, and when rotation ceases the two sets of teeth lock together. The elasticity of the spring allows the clutch member to be forced out of such engagement when the member 6 is rotated in either direction. It is obvious that since the cross-sectional form of the threaded portion of the pivot 3 corresponds to that of the hole 5 in the part 1 the whole attachment rotates or moves with the said part as the latter is vibrated in use, so that the fastening can never become accidentally loosened.

It will be understood that in place of making the opening 5 in the part 1 oblong and the threaded portion of the pivot-screw 3 of corresponding shape in cross-section any other form may be adopted which will attain the same end—namely, the prevention of rotation of the screw-pivot independently of the part 1. The claim hereinafter made is therefore to be interpreted in the light of this statement.

The invention is applicable as a lock-nut and screw attachment for connecting any two or more parts, whether movable on each other or not.

What I claim is—

The combination, with the shear-blades and a pivot-screw which is freely rotatable in one of them but is locked to, and thus rotates with, the other, the blade thus locked with the screw having a circular ratchet member 4, of a rotatable member comprising a ratchet-disk, 6, and opposite lateral projections 9, which are adapted to serve as thumb-pieces for rotating the said member, the same being provided interiorly with vertical grooves 12, a nut applied to the screw-pivot and having opposite lateral wings, 11, adapted to enter and slide freely in the aforesaid grooves, and a spring interposed between the nut and the rotatable ratchet member, as stated and described.

EDWARD LINCOLN PITTS.

Witnesses:
 Geo. A. Mintz,
 A. J. Bradley.